(12) United States Patent
Yu et al.

(10) Patent No.: US 6,684,087 B1
(45) Date of Patent: Jan. 27, 2004

(54) METHOD AND APPARATUS FOR DISPLAYING IMAGES ON MOBILE DEVICES

(75) Inventors: Francis H. Yu, Redwood Shores, CA (US); Neil J. Cormia, San Jose, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/306,750

(22) Filed: May 7, 1999

(51) Int. Cl.[7] ................................................. H04B 1/00
(52) U.S. Cl. ................. 455/566; 455/414.3; 455/414.4
(58) Field of Search ............................... 455/412, 414, 455/418, 419, 566, 556, 557, 412.1, 414.1, 414.3, 414.2, 414.4; 709/206, 217, 219; 345/660, 667, 668; 701/200, 208, 218, 211

(56) References Cited

U.S. PATENT DOCUMENTS

| | | | |
|---|---|---|---|
| 5,964,830 A | * | 10/1999 | Durrett ........................ 709/217 |
| 6,012,083 A | * | 1/2000 | Savitzky et al. ............. 709/217 |
| 6,078,820 A | * | 6/2000 | Wells et al. ................. 455/466 |
| 6,192,258 B1 | * | 2/2001 | Kamada et al. ............. 455/566 |
| 6,243,739 B1 | * | 6/2001 | Schwartz et al. ........... 455/566 |
| 6,301,471 B1 | * | 10/2001 | Dahm et al. ................ 455/414 |

FOREIGN PATENT DOCUMENTS

| | | |
|---|---|---|
| EP | 0 246 010 A1 | 11/1987 |
| EP | 0 994 433 A1 | 4/2000 |
| WO | WO 98/39728 | 11/1998 |

* cited by examiner

Primary Examiner—Nay Maung
Assistant Examiner—Tanmay Lele
(74) Attorney, Agent, or Firm—Beyer Weaver & Thomas, LLP

(57) ABSTRACT

According to the principles disclosed herein, an image requested by a mobile device is first processed in a server device. In accordance with a set of parameters about the screen of the mobile device, the requested image is transformed to a reduced version that fits well into the screen. In addition, the reduced version is inherently divided into a number of subareas, each embedded a link to a detailed version thereof and associated with one of the keys in the mobile device. When the reduced version is, displayed on the mobile device, a user decides to view an area that falls into one of the subareas, a corresponding key is activated. A new request including the link is send to the server device that consequently sends out the detailed version. Similary, the detailed version is inherently divided into the same number of subareas. As a result, all parts in the original image can be recursively viewed.

36 Claims, 10 Drawing Sheets

METHOD AND APPARATUS FOR DISPLAYING IMAGES ON MOBILE DEVICES

BACKGROUND OF THE INVENTION

1. Field of the Invention

This invention relates generally to the area of image display, and more particularly to a method and system for displaying recursively images on a display screen of a mobile device, wherein the images are of larger dimensions than that of the display screen and the mobile device may include a cellular telephone, a two-way pager, and a palm-sized computing device:

2. Description of the Related Art

The Internet is a rapidly growing communication network of interconnected computers and computer networks around the world. Together, these millions of connected computers form a vast repository of multimedia information that is readily accessible by any of the connected computers from anywhere at any time. To navigate the Internet, the connected computers, such as workstations and desktop computers, typically operate what is commonly called "browser", an application (client) program that generally uses the Hypertext Transfer Protocol (HTTP) to make requests to the multimedia information throughout the Internet. These computers capable of operating the browser using HTTP are generally powerful, having sufficient computing resources, such as processing power, memories, display capabilities and user interfaces. When the multimedia information is static image data, only constrained to the local memory, the image data can be downloaded to the computers and then manipulated and displayed. To provide mobility and portability of the Internet, interactive two-way communication mobile devices are introduced and capable of communicating, via wireless data networks, with the Internet. The interactive two-way communication mobile devices, including two-way pagers, cellular phones, palm-sized computing devices and personal digital assistant (PDA) apparatuses are among the fastest emerging communication devices introduced recently that enable users to receive, collect, analyze, review and disseminate information as they travel or move about. Contrary to the computers coupled to the Internet, the mobile devices are characterized by thin designs in terms of power consumption and cost constraints that may include less memory, Lower processing power, etc. Consequently, displaying images on the mobile devices has been a difficult task. Further, the input interface provided is often limited to a keypad or soft keys that have far fewer available keys than a PC keyboard does. Furthermore, the mobile devices, such as the cellular phones, are often lack of a pointing mechanism as opposed to a mouse coming with nearly every desktop computer. Hence interacting with a displayed image becomes even a more difficult task.

There is, therefore, a great need for a solution that allows an image to be displayed on the screen of a mobile device without taking up the local memory therein and further permits a user to interact with the image when being displayed.

SUMMARY OF THE INVENTION

The present invention has been made in consideration of the above described problems and needs and has particular applications to the navigation of Internet web pages by two-way interactive communication mobile devices. The design constraints commonly seen in the mobile devices includes a relatively slow processor, less memory and limited graphics make it economically and technically impractical for the mobile devices to operate a regular browser so as to display images created for those personal computers. The principles of this invention, nevertheless, make it now possible for the thin designed mobile devices to effectively interact with the Internet to display recursively those images.

According to one aspect of the present invention, the image requested by a mobile device is first processed in a server device. In accordance with a set of parameters about the screen of the mobile device, the requested image is transformed to a reduced version that fits well into the screen. In addition, the reduced version is inherently divided into a number of subareas, each embedded a link to a detailed version thereof and associated with one of the keys in the mobile device. When the reduced version is displayed on the mobile device, a user decides to view an area that falls into one of the subareas, a corresponding key is activated. A new request including the link is sent to the server device that consequently returns the detailed version. Similary, the detailed version is inherently divided into the same number of subareas. As a result, all parts in the original image can be recursively viewed.

The advantages of the invention are numerous. Different embodiments or implementations may yield one or more of the following advantages. The original image does not have to be downloaded into a mobile device, which aleviates a very high bandwidth requirement on a wireless data network and reduces traffics therein. A user will not experience any significant delay when requesting an image from a web site as now only a fixed number of image data are transmitted every time a request is made. Further the images could be created independently from the screen sizes of mobile devices that are often varying in sizes and types.

Accordingly, one of the objects of this invention is to provide a generic solution to two-way communication mobile devices that can effectively interact with a data network, such as the Internet, for images.

Other objects, together with the foregoing are attained in the exercise of the invention in the following description and resulting in the embodiment illustrated in the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

According to the principles of this invention, an image being requested by a mobile device is first preprocessed in a server that reduces the dimensions of the image to proper dimensions for display on the screen of the mobile device. The server further provides respective hyperlinks to subareas of the reduced image divided by a grid so that a detailed version can be provided when one of the subareas is activated. Similarly, the detailed version is divided by the grid and hyperlinks are respectively provided to the subareas in the detailed version. As a result, a user is able to see recursively all the details that the original image provides.

It will be appreciated that the present invention disclosed herein can be advantageously used on portable devices with small screens to access images originally created for regular personal computers. In the following description of the present invention, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry will not be described in detail to avoid unnecessarily obscuring aspects of the present invention.

Figure 1:
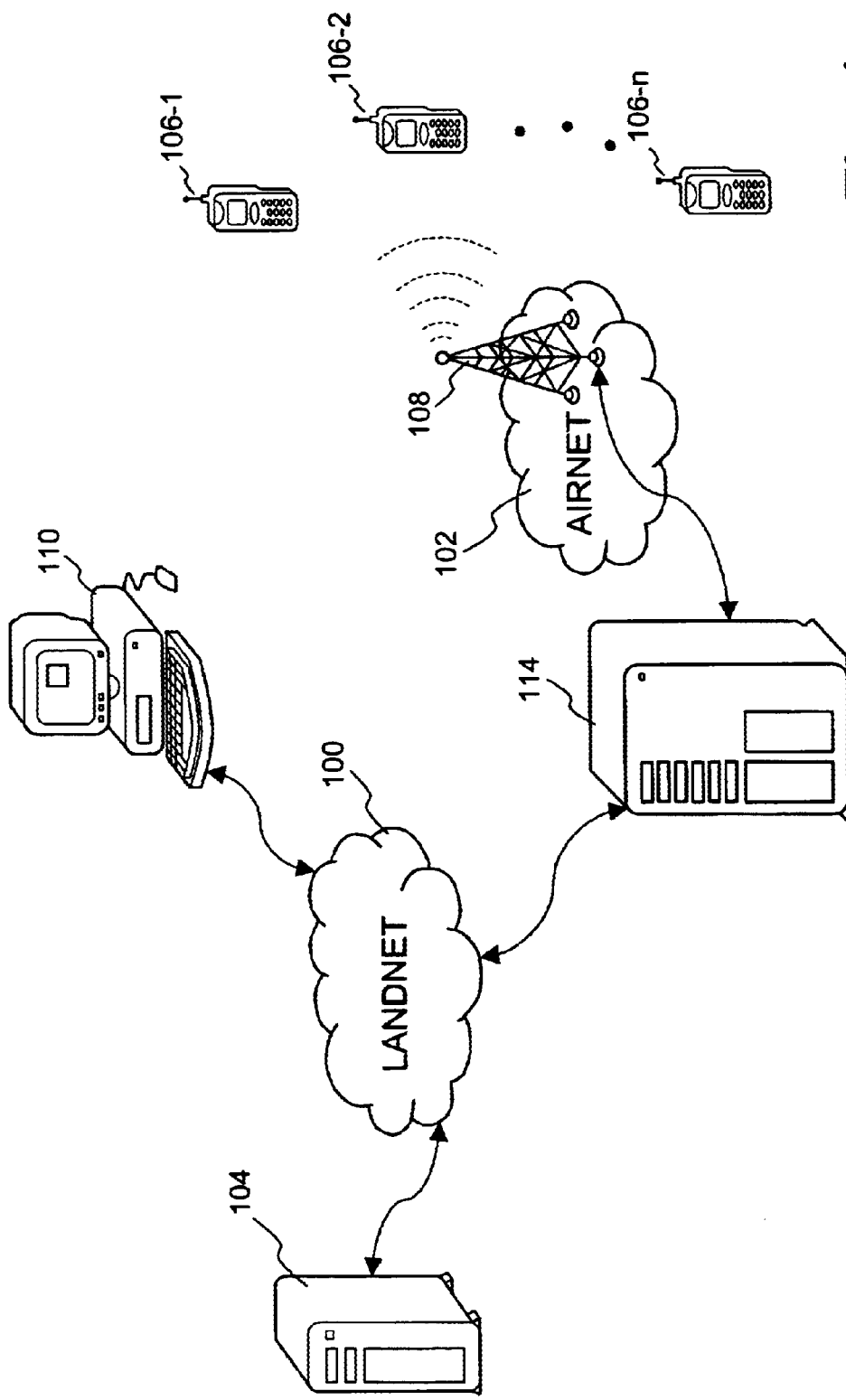
FIG. 1 illustrates a schematic configuration in which the present invention may be practiced.

Referring now to the drawings, in which like numerals refer to like parts throughout the several views. FIG. 1 illustrates a schematic configuration in which the present invention may be practiced. Landnet 100 is a landline network that may be the Internet, the Intranet and a data network of other private networks. Coupled to landnet 100 are a personal computer (PC) 110 and a network server 104. Personal computer 110 may be a Pentium-based desktop personal computer. Preferably, personal computer 110 runs a HyperText Markup Language (HTML) browser, such as Netscape Navigator, via landnet 100 using HyperText Transfer Protocol (HTTP) to access information stored in network server 104 that may be a workstation from Sun Microsystems, Inc. The information stored in network server 104 may be hypermedia information including image data created and accessible by personal computer 110 for display thereon.

There are n mobile devices 106 serviced by airnet 102. Mobile devices 106 herein are considered interactive two-way communication devices that include, but are not limited to, mobile computing devices, cellular phones, palm-sized computing devices with PDA (Personal Data Assistants) functionality and Internet-capable appliance remote controllers, and capable of communicating wirelessly with antenna 108 via airnet 102. For simplicity, antenna 108 also represents a wireless carrier infrastructure that generally comprises a base station and an operations and maintenance center. The base station controls radio or telecommunication links with mobile devices 106. The operations and maintenance center comprises a mobile switching center performing the switching of calls between the mobile devices and other fixed or mobile network users. Further the operations and maintenance center manages mobile account services, such as authentication, and oversees the-proper operation and setup of the wireless network. Each of the hardware components and processes in carrier infrastructure 108 are known to those skilled in the art and not to be described herein to avoid unnecessarily obscuring aspects of the present invention.

Between landnet 100 and airnet 102 there is a link server device 114 functioning as a bridge between the two networks 100 and 102. Link server device 114, also referred to as proxy server or wireless data server or network gateway server, may be a workstation or a personal computer. Link server 114, loaded with many processes including compiled and linked version of one embodiment implementing the present invention, couples airnet 102 to landnet 100 and performs many functions to be described in detail below. Those skilled in the art understand that any server devices coupled to landnet 100 may be used to provide functions carried out by link server device 114.

Figure 2:
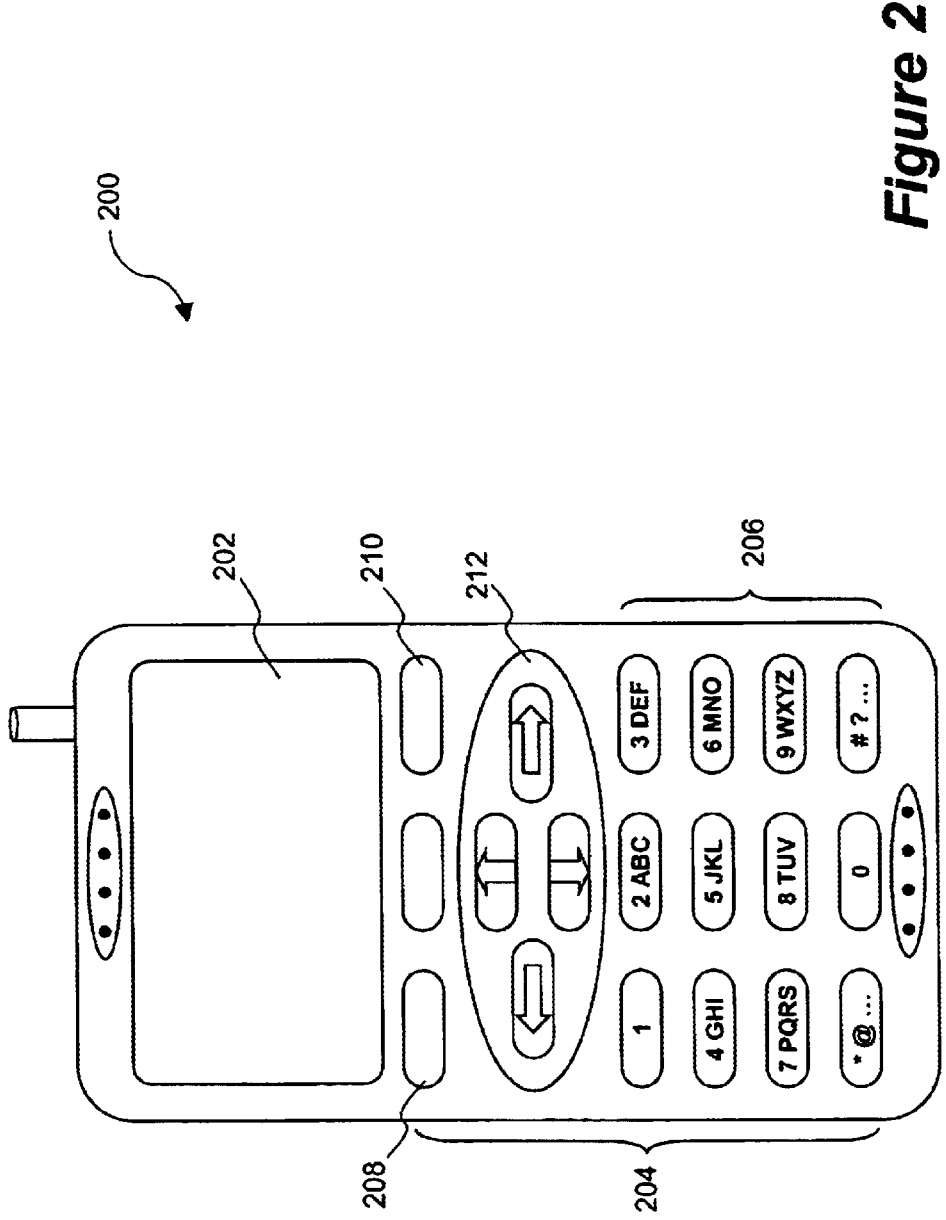
FIG. 2 depicts a typical digital cellular phone that can be used as one of the mobile devices in the arrangement of FIG. 1 to practice the present invention.

To facilitate the description of the present invention, FIG. 2 depicts a typical GSM digital cellular phone 200 that can be used as one of the mobile devices 106 in the arrangement of FIG. 1 to practice the present invention. Cellular phone 200 includes a small screen 202 and an extended phone keypad 204. Screen 202 is typically a LCD display capable of displaying perhaps four lines high by twenty or more characters and the graphics capabilities thereof are limited. Extended phone keypad 204 comprises, preferably, a regular phone keypad 206, a pair of generic keys 208 and 210 and positioning key 212. Generic keys 208 and 210, if there are any, are used to activate soft keys displayed in screen 202 and positioning key 212 is to reposition an element indicator or a cursor to activate, for example, one of the hyperlinks displayed in screen 202. It should be understood; however, generic keys 208 and 210 and positioning key 212 are not necessary in practicing the present invention, they can be replaced by a set of designated keys in regular phone keypad 206 but provide preferred convenient means for a user to interact efficiently with the phone 200. It should be noted that some of the mobile devices sometimes have no physical keys at all, such as those palm-size computing devices that, however, use soft keys or icons for users to activate them by using a finger or a pseudo-pen. In the following, unless otherwise specifically described, keys or buttons are generally referred to as either the physical keys or soft keys.

Each of hardware components in digital cellular phone 200 is known to those skilled in the art, so the hardware components are not described in detail herein. According to one embodiment, compiled and linked processes of the present invention are stored in random access memory (ROM) as a client module and a support module. Upon activation of a predetermined key or key sequences utilizing keypad 204, a physical layer processor in digital cellular phone 200 causes the client module, via a radio transceiver therein, to communicate with link server 114 of FIG. 1. It is generally understood that a computing device equipped with an HTML browser using HTTP can access image data in a network server and download the image data for local display. However, this paradigm is not desirable when the computing device is a thin client, such as a cellular phone 200 of FIG. 2. Current HTTP requires considerable computing power and network bandwidth resources. For example, a request from the computing device to establish a communication session with a network server may require an exchange of a number of data packets. In addition to the resources required to implement HTTP, significant resources must be supported in the computing device to request, format, process and display image information. This is not a significant disadvantage in many situations because the computing device, including personal computers and workstations coupled to a network generally has sufficient computing power, memory and display capabilities.

Cellular phone 200 or mobile devices 106 of FIG. 1, however, do not currently have the computing resources to implement HTTP to run an HTML browser. To keep the portability and usability of a mobile device, there are many design constraints, as opposed to those of a desktop computer, including limited maneuvering mechanism, low memory and display capabilities. For example, a typical color image for display on a desktop computer is 640×480 that have megabyte data. It would be a forbidden task to download any data of that magnitude in a wireless network.

From the perspective of displaying on a mobile device a color image generated for a desktop computer, it may be understood to those skilled in the art that the mobile device is not a mere replacement of a desktop computing device or a combination of a wireless communication module with a personal computer. Further, it may be appreciated that making a mobile device, such as cellular phone 200, capable of displaying such images is a significant departure from prior art systems.

Figure 3A:
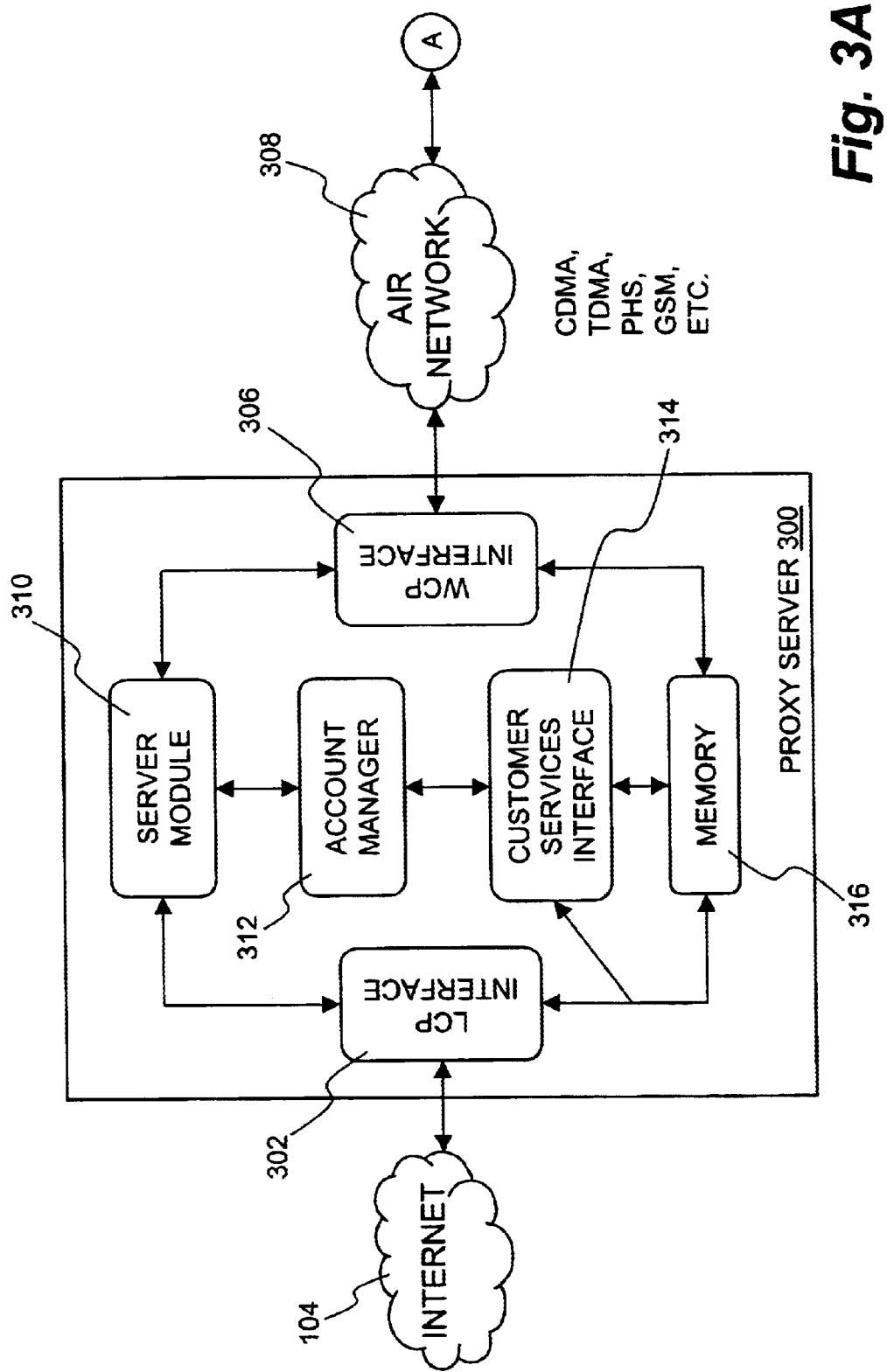
FIGS. 3A and 3B show, respectively, a functional block diagram of a link server device and a mobile device according to an embodiment of the present invention.
Figure 3B:
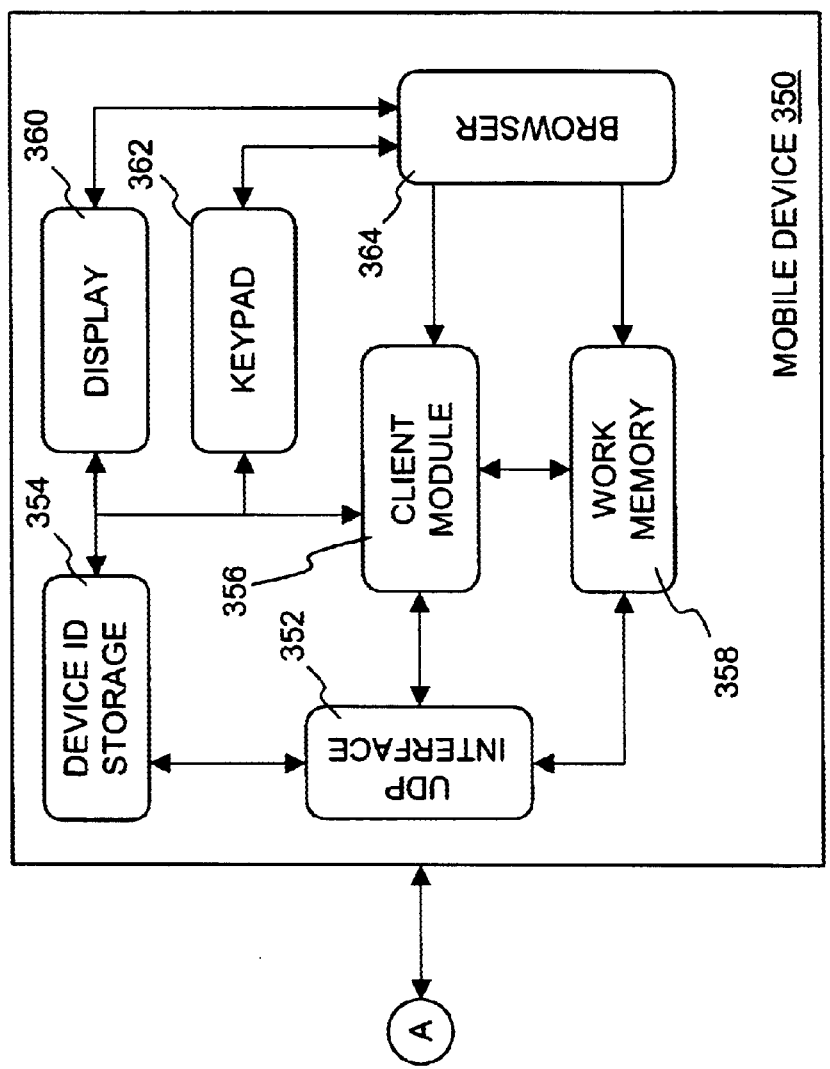

Referring now to FIGS. 3A and 3B, there are respectively shown a functional block diagram of a link server device and a mobile device according to an embodiment of the present invention. Link server device, or simply link server 300, that may represent link server 102 of FIG. 1, is typically a server computer and mobile device 350 may, for example, correspond to one of mobile devices 106 of FIG. 1 or cellular phone 200 of FIG. 2. To avoid obscuring aspect of the present invention, well known methods, procedures, components and circuitry in link server 300 and mobile device 350 are not described in detail.

Link server 300 comprises a landnet communication protocol (LCP) interface 302 that couples to landnet 304, a wireless communication protocol (WCP) interface 306 that couples to a wireless network 308 via a carrier's infrastructure (not shown in the figure). LCP interface 302 implements a communication protocol operated in landnet 304. Generally, LCP interface 302 is an HTTP interface when landnet 304 is the Internet. Similarly, airnet 308 may support a wireless communication protocol suitable for the characteristics of a particular wireless network such as Cellular Digital Packet Data (CDPD), Global System for Mobile Communications (GSM), Code Division Multiple Access (CDMA) and Time Division Multiple Access (TDMA) to name a few. One of the common wireless communication protocols is Handheld Device Transport Protocol (HDTP) (formerly known as Secure Uplink Gateway Protocol (SUGP)), which runs on User Datagram Protocol (UDP). In this embodiment, WCP interface 306 is implemented with a UDP or HDTP interface. Other possible protocols for airnet 308 may include HTTP, Wireless Session Protocol (WSP) and other emerging protocols that facilitate the transport of data in a wireless data network.

To facilitate the description of the present invention, the wireless communication protocol is HDTP according to one embodiment. It can be appreciated by those skilled in the art that this particularity does not imply any limitation of the present invention to this exemplary communication protocol. As described above, the wireless communication protocol may be HTTP in which case both landnet 100 and airnet 102 are supporting the same protocol and there is no need to perform data mapping between two protocols. This is a typical case when link server 300 is implemented in one of the server devices on the Internet. Link server 300 further comprises a server module 310 coupled between LCP interface 302 and WCP interface 306. Server module 310, typically loaded in a memory, performs traditional server processing as well as protocol conversion processing from one communication protocol to another communication protocol. In particular, the protocol conversion processing includes protocol conversion between HDTP/UDP and HTTP/TCP according to the embodiment.

In server module 310, account manager 312 manages through account interface 314 a plurality of user accounts for all the mobile devices serviced by link server 300. Each of the mobile devices, such as 350, is assigned with a device identifier or identification (ID). Device ID may be a phone number of the device or an IP address or a combination of an IP address and a port number, for example: 204.163.165.132:01905 where 204.163.165.132 is the IP address and 01905 is the port number. The device ID is further associated with a subscriber ID created and administrated by a carrier administrating link server 300 as part of the procedures to activate a subscriber account for mobile device 350. The subscriber ID may take the form of, for example, 861234567-10900_pn .mobile.att.net by AT&T Wireless Service, and is a unique identification to a mobile device. In other words, each of mobile devices 106 serviced by link server 114 in FIG. 1 has a unique device ID that corresponds to a respective user account managed in link server 114.

Figure 4:
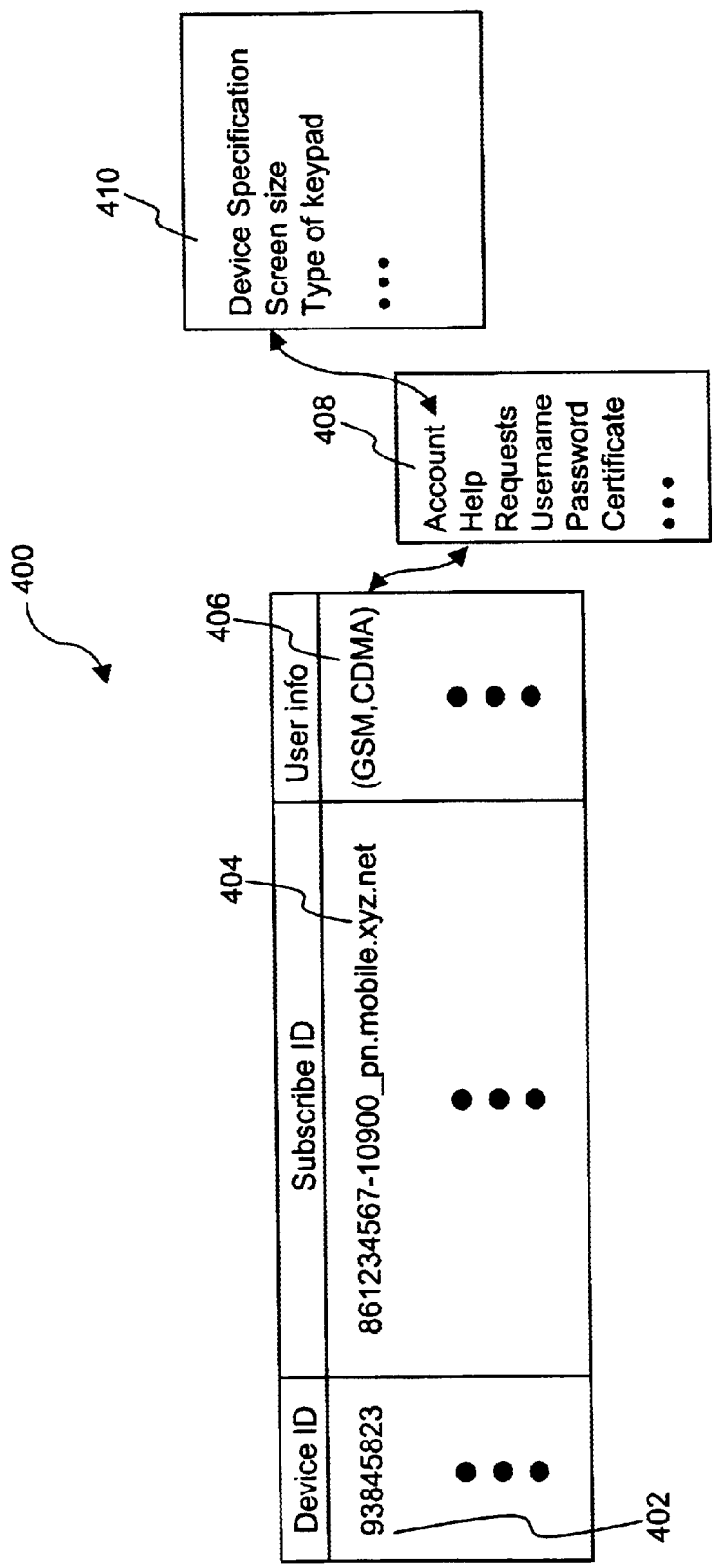
FIG. 4 shows an exemplary structure of possible user accounts managed by an account manager in a server device.

Additionally, account manager 312 is responsible for creating a user account for a mobile device that anonymously communicates with link server 114. In this case, account manager 312 ensures proper (limited) access of the anonymous mobile device to services provided by link server 114. FIG. 4 shows an exemplary structure 400 of possible user accounts managed by account manager 312. It should be noted that the user accounts may not be physically located in link server 300 and in reality can be remotely located in one of the computing devices coupled to landnet 104. Through account interface 314 that has proper and secure access to the user accounts, account manager 312 can conduct the duties of account management as discussed more below. Device ID column 402 is filled with the device IDs of mobile devices that further respectively correspond to subscriber IDs in subscriber ID column 404. Credential information column 406 lists respective credential information needed to access each associated account. User info 408 may include the account configuration information, for example, device ID "6508171453" is a mobile phone that is pre-configured to work in a GSM network and, probably, may be provided with an option to switch to a CDMA network if the user moves into an area that has only CDMA network available. Further entries in user info column 408 may include pointers or linkages 410 to other account related information, such as parameters of the mobile device associated with the account. The device parameters may include the type of the mobile device, the user input mechanism thereof, the screen sizes (i.e. width and height) and etc.

Returning now to FIGS. 3A and 3B, maintaining a database of user accounts permits account manager 312 to conduct authentication and verification processes of the subscribed mobile devices and control access to provided services by all mobile devices (subscribed or anonymous devices) in wireless data network 308. More importantly in the present invention, account manager 312 is responsible for providing device information to facilitate the interactive display of an image fetched from the Internet 104.

Figure 5B:
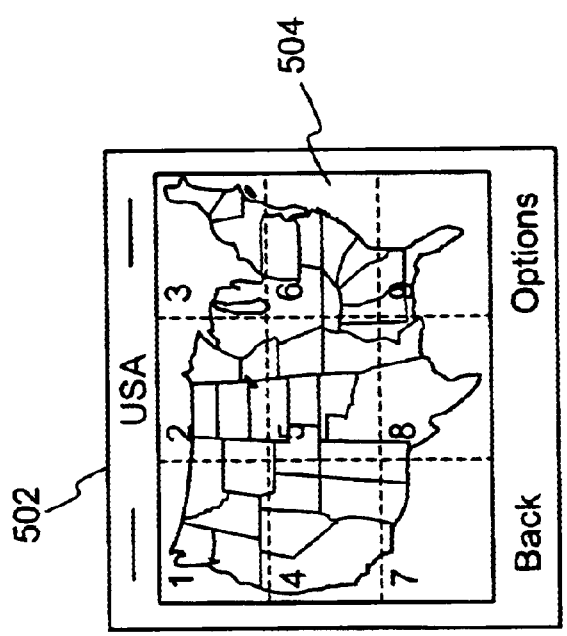
FIGS. 5B, 5C, and 5D, respectively, shows a reduced image being displayed on a screen of a mobile device.
Figure 5A:
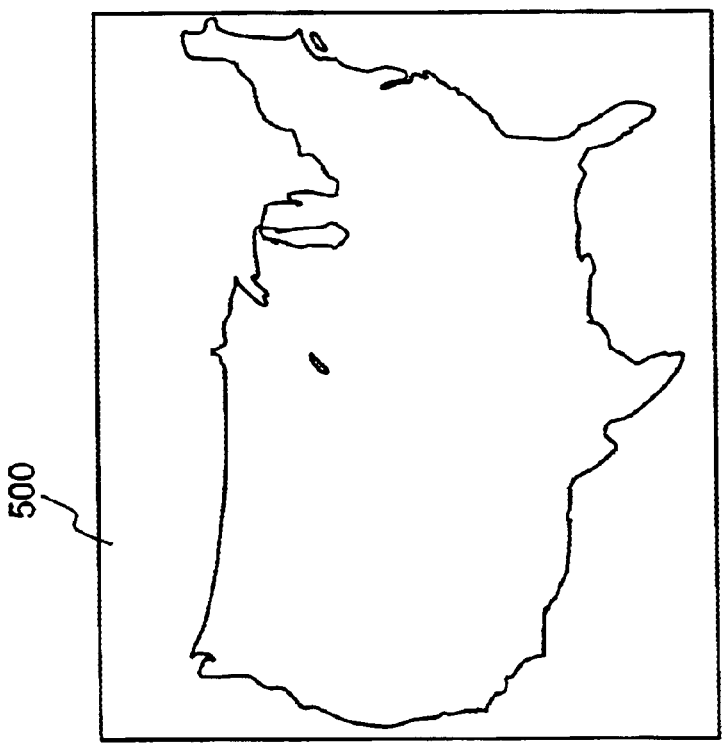
FIG. 5A shows an exemplary image that may be fetched from a resource (e.g. service server) on the Internet.

Referring to FIG. 5A, there is shown an exemplary image 500 that may be fetched from a service server on the Internet. Image 500 is go Am generated by the service server, for example, MapQuest.com, Inc., to be displayed on a desktop computer with a large screen display. With a mobile device, image 500 would not be properly displayed on a screen of less than 3 inches commonly seen in the mobile device. According to one embodiment of the present invention, image 500 is first fetched into link server 300 when image 500 is requested by mobile device 350 through link server 300. Image 500 is then preprocessed with the parameters of mobile device 350 provided in the associated account. The parameters used may include the screen size and the type. The purpose of the preprocessing is to ensure that a reformatted version of image 500 can be properly displayed. Image 500, for example, has a size of 640 by 480 pixels and a screen of mobile device 350 can display an image of 70 by 60 pixels. One aspect of the preprocessing is to reduce or decimate image 500 to the size of 70 by 60 pixels. A linear interpolation approach, known to those skilled in the art, is used to reduce image 500 to the appropriate size although there are other methods that are available to achieve essentially the same.

FIG. 5B shows a reduced image 504 being displayed on screen 502 of mobile device 350. With the absence of a pointing mechanism, which is commonly seen in a cellular phone, one of the important features in the present invention is to provide navigation in a chain of areas of interest. The numeric keys in a phone keypad are arranged in a 3 by 3 matrix and each of the keys is designated to activate a sub-region in the displayed image when being pressed or activated. Reduced image 504 is geometrically and inherently divided into 9 hot or sensitive areas, each corresponding to one of the keys. As shown in FIG. 5B, the top three areas corresponding respectively to the keys "1", "2", and "3", the middle three areas corresponding respectively to the keys "4", "5", and "6", and the bottom three areas corresponding respectively to the keys "7", "8", and "9". Each of the sensitive areas, referred to as "1", "2", "3", "4", "5", "6", "7", "8", and "9" area, respectively, is provided by a hyperlink to another image.

Figure 5D:
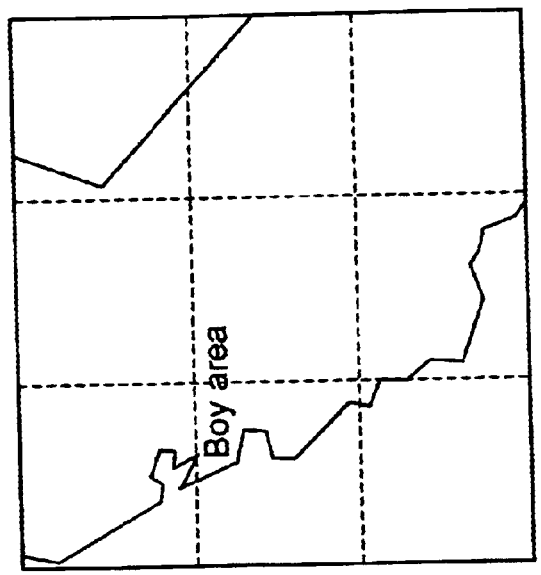
Figure 5C:
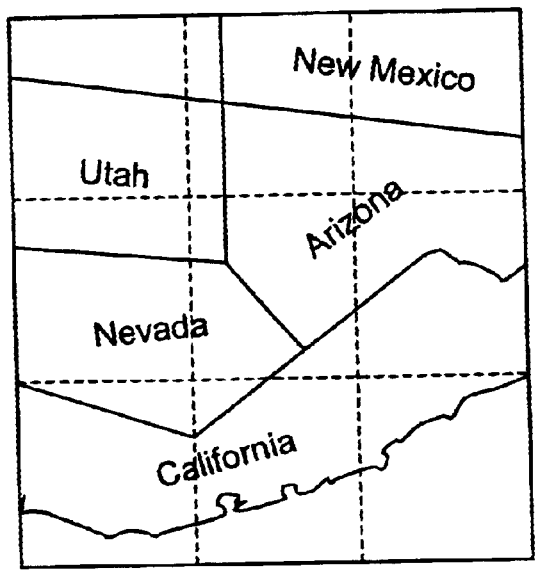

To be specific, a user is interested in the Bay area in California which is too small to be viewed clearly together with all the states of the country being displayed in the screen 502. Since the state of California appears located in the "4" area of the middle row, the key "4" is then activated to request a detailed version of the "4" area. FIG. 5C shows the detailed version of the "4" area is displayed. If the user further presses the key "4", the details of the Bay area starts to reveal in the screen as shown in FIG. 5D. Depending on the original image 500, the details can be requested until the original image 500 could provide.

From the image resolution perspective, the original image 500, regardless of the dimensions thereof, can be displayed, block by block and hierarchically, on the small screen of a mobile device.

Figure 6A:
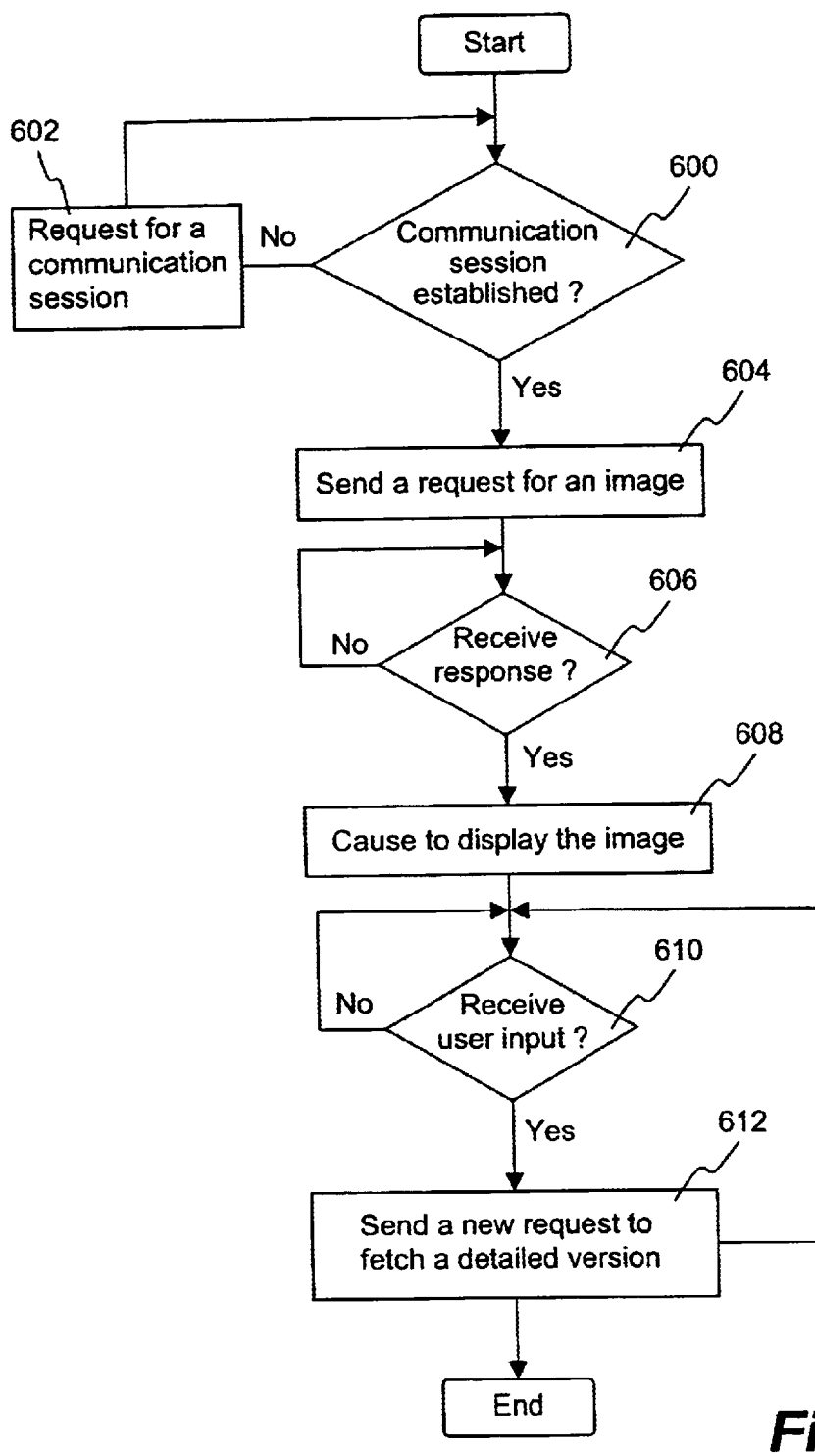
FIGS. 6A and 6B illustrate, respectively, a process flowchart of the image navigation process in a mobile device and a link server according to one embodiment of the present invention.
Figure 6B:
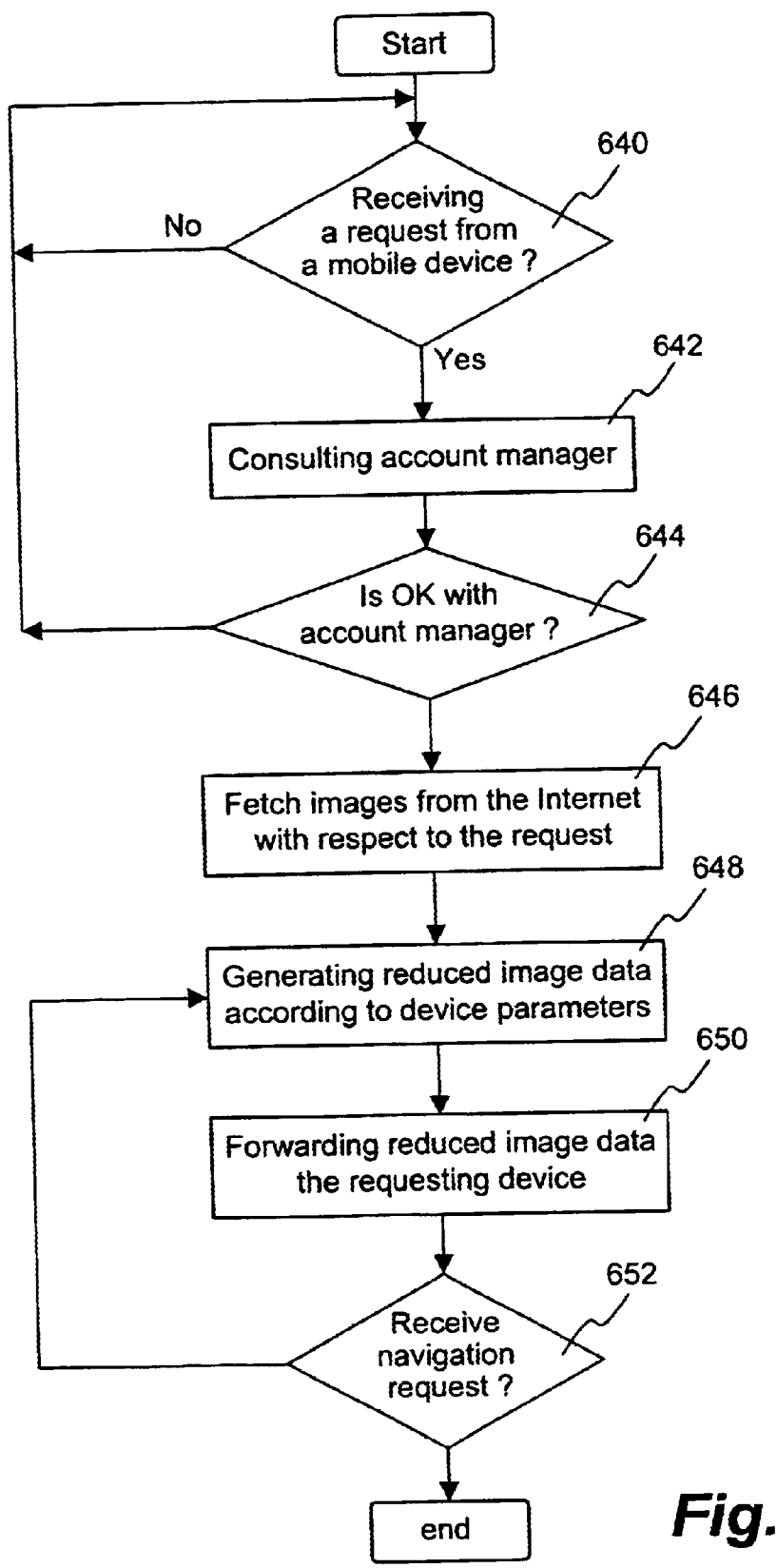
Figure 7:
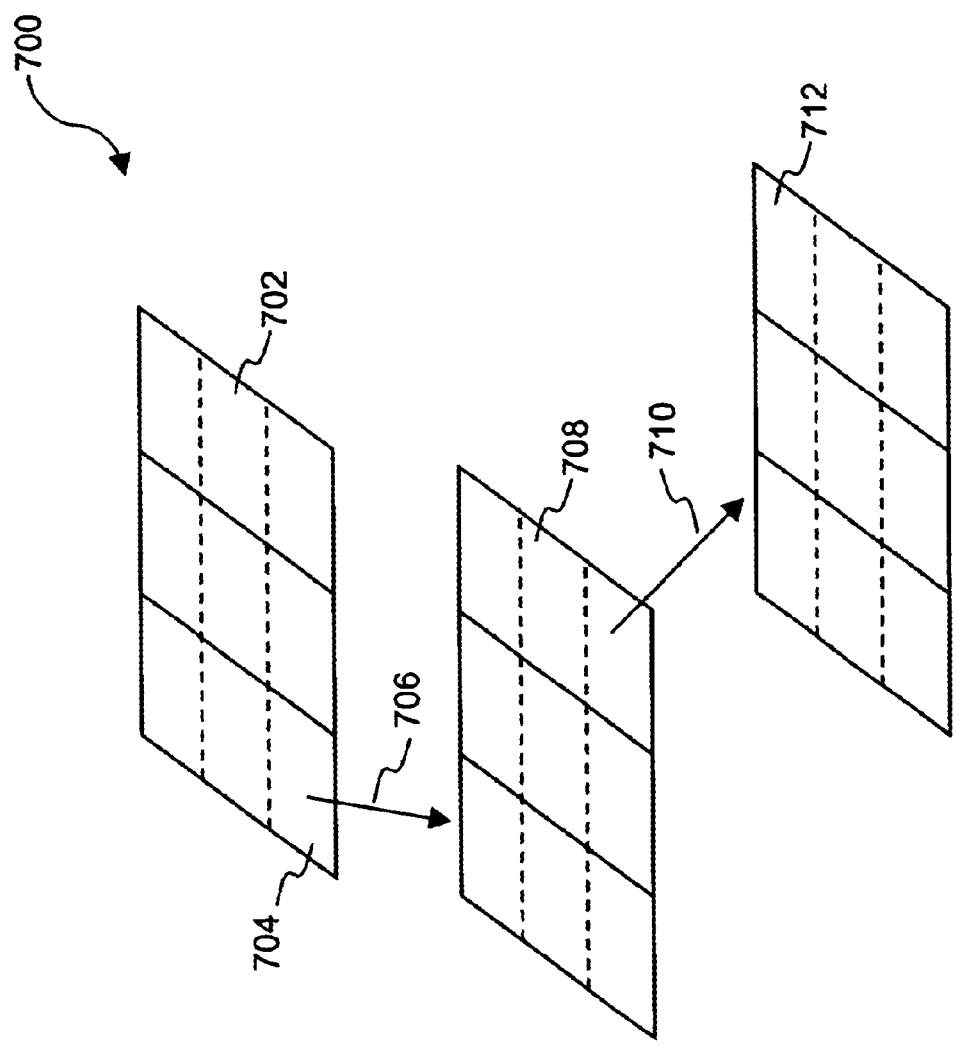
FIG. 7 shows an exemplary image hierarchy.

FIGS. 6A and 6B illustrate, respectively, a process flowchart of the image navigation process in mobile device 350 and link server 300 and should be understood in conjunction with the previous figures and FIG. 7. The flowchart in FIG. 6A is for the process in the mobile device. At 600, the mobile device checks if a communication session is established or valid with the link sever. If the communication session is not established or expired, the mobile device at 602 sends a message to the link server to establish a new communication session. Otherwise at 604, the mobile device sends a request to fetch an image of interest. Typically, a request comprises a device identification identifying the device and a first address identifier (e.g.. a domain address) identifying the link server and a second address identifier identifying a resource from which the image is fetched. The resource may be another server device coupled on the landnet or the Internet and typically provides hypermedia information including image data for others to access.

After the request is sent, the mobile device awaits a response from the link server at 606. Generally, there is a time limit, namely after a predefined period if no response has been received, the mobile device aborts the request and sends another request. At 608, an image is received. It must be pointed out, the received image, referred to as a reduced image, is not the image originating from the resource. The reduced image, as the name suggests, is a transformed image from the original image and preferably fits perfectly in the screen of the mobile device.

The reduced image is inherently divided into a number of subareas, each of the subareas embedded with a hyperlink to a detailed version thereof. The number of the subareas is typically the number of keys that are designated or available for navigation. For example, there are at least 10 numerical keys in a typical phone keypad, here the reduced image is preferably divided equally into 3 by 3 subareas, each corresponding to one of the nine keys "1", "2", "3", "4", "5", "6", "7", "8" and "9". If a user wants to see a particular area, a corresponding numerical key is activated at 610, which invokes the mobile device to generate a new request that includes the underlaying hyperlink. At 612, the new request is sent to the link server for a detailed version of the particular area.

Referring to FIG. 6B, there is shown a respective process in the link server. At 640, the link server constantly checks if a request is received from any of the mobile devices it services. When a request is received from one of the mobile device, at 642, the link server or the server model loaded therein consults the account manager if the request is from one of the mobile devices being serviced by comparing the device identifier with the corresponding account. When the mobile device is authenticated, the account manager further retrieve a set of parameters about his mobile device, for example, the dimensions and resolution of the screen that mobile device has.

At 646, the link server, on behalf of the mobile device, contacts the resource for the image that the mobile device wants. After the image is fetched over, the link server processes the image according to the parameters at 648. Given the dimensions and resolution of the screen, the link server generates an image hierarchy that starts with the reduced image. Referring to FIG. 7, there is shown an exemplary image hierarchy 700. Layer 0 702 is the reduced image with dimensions properly fit into the screen for display and equally divided into 9 subareas. Each of the subareas includes a link to a detailed version thereof. Specifically, the "7" area 704 has a line 706 that points to a detailed version 708. From the image perspective, the "7" area is "enlarged" three times in the detailed version 708. Practically, the detailed version 708 is generated from the original image with respect to the reduced image to ensure that the detailed version 708 is again fit into the screen. Further to the example in FIG. 7, the "9" area has a link 710 to yet another detailed version 712 thereof.

More specifically, images 702, 708 and 712 are all the same dimensions properly for the screen of the particular mobile device but have different content resolutions. In other words, image 702 covers 9 or 81 of those images like image 708 or 712 but is so reduced to give a user a brief view of the 9 or 81 images. The user must selects to view a subarea that results in a detailed version.

Optionally, the image hierarchy 700 does not have to be generated upon receiving the original image from the resource. Depending on the implement preference, a detailed version of one of the subareas may be generated upon receiving a request specifically asking for the detailed version.

Referring back to FIG. 6B, the detailed version is forwarded to the mobile device for display at 650. If a user enters another request for one of the subareas in the displayed detailed version at 652, the link server will recursively provide the detailed version to the resolution of the original image provides.

The present invention has been described in sufficient detail with a certain degree of particularity. It is understood to those skilled in the art that the present disclosure of embodiments has been made by way of example only and that numerous changes in the arrangement and combination of parts as well as steps may be a resorted without departing from the spirit and scope of the invention as claimed. Accordingly, the scope of the present invention is defined by the appended claims rather than the forgoing description of embodiments.

We claim:

1. A method for recursively displaying on a screen of a mobile device an image having dimensions much larger than the dimension of the screen; the method comprises:

displaying on the screen of the mobile device a reduced image forwarded from a server device, the reduced image transformed from the image with respect to a set of parameters associated with the screen;

generating a new request when a key in the mobile device corresponding to a subarea in the reduced image is activated; and receiving a detailed image of the subarea from the server device when the server device renders the new request.

2. The method as recited in claim 1 further comprising:

generating a request to fetch the image from a data network; the request comprising a device identifier identifying the mobile device; and sending the request to the server device through a wireless network.

3. The method as recited in claim 2;

wherein the image is originated from a web site coupled to the data network; and wherein the server device is coupled between the wireless network and the data network.

4. The method as recited in claim 1; further comprising:

displaying on the screen the detailed image, wherein the detailed image is inherently divided into a number of subareas, each of the subareas associated with a hyperlink to another detailed image thereof.

5. The method as recited in claim 4, wherein the mobile device has a plurality of keys, each corresponding to one of the subareas, an activation of one of the keys invoking the hyperlink to request the another detailed image.

6. The method as recited in claim 5; wherein the mobile device is a cellular telephone.

7. The method as recited in claim 1; wherein the set of parameters include dimensions and resolution information about the screen of the mobile device.

8. The method as recited in claim 7; wherein the reduced image is transformed to fit in the screen of the mobile device.

9. The method as recited in claim 8;

wherein the mobile device has a plurality of keys; and wherein the reduced image is inherently and equally divided into a number of subareas, each associated with a hyperlink to a detailed version thereof and corresponding to one of the keys, an activation of one of the keys invoking the hyperlink to receive the detailed version.

10. A method for recursively displaying on a screen of a mobile device an image having dimensions much larger than the dimension of the screen; the method comprises:

displaying on the screen of the mobile device a reduced image forwarded from a server device, the reduced image being inherently and equally divided into a number of subareas, each of the subareas embedded with a hyperlink to a detailed version thereof and associated with one of keys of the mobile device;

generating a new request in response to an activation of one of the keys for the detailed version; the new request comprising a device identifier identifying the mobile device; and receiving the detailed version from the server device after the server device renders the new request.

11. The method as recited in claim 10; wherein the reduced is transformed from the image by the server device according to a set of parameters about the screen of the mobile device.

12. The method as recited in claim 11; wherein the mobile device is a cellular telephone and a keypad thereof comprises the keys.

13. The method as recited in claim 11; wherein the mobile device is a palm-sized computer and the keys are displayed on the screen for a user to activate.

14. A method for recursively displaying on a screen of a mobile device an image having dimensions much larger than the dimension of the screen; the mobile device having a keypad including a number of keys; the method comprises:

displaying on the screen of the mobile device a reduced image forwarded from a server device, the reduced image being inherently and equally divided into a number of subareas, each of the subareas embedded with a hyperlink to a detailed version thereof;

moving a cursor in response to an activation of one of the keys to one of the subareas;

generating a new request; the new request comprising the hyperlink to the detailed version of the one of the subareas; and sending the new request to the server device to receive the detailed version therefrom after the server device renders the new request.

15. The method as recited in claim 14; wherein the keypad comprises 10 numeric keys, of which four are designated to move the cursor, respectively, upward, downward, leftward and rightward.

16. The method as recited in claim 15; wherein the mobile device is cellular telephone communicating with the server device through a wireless network and the server device receives the image from the Internet.

17. A method for recursively displaying on a screen of a mobile device an image having dimensions much larger than the dimension of the screen, the mobile device having a keypad including a number of keys; the method comprises:

fetching the image from a resource on a landnet according to a request from the mobile device; the request comprising an address identifier identifying the resource;

generating from the image an image hierarchy starting with a reduced image equally divided into a number of subareas, each of the subareas pointing to a detailed version thereof; and forwarding the reduced image to the mobile device for display.

18. The method as recited in claim 17, further comprising:

receiving the request from the mobile device through a wireless network; the request further comprising a device identifier identifying the mobile device; and consulting an account manager to determine if the mobile device is authenticated by examining the device identifier.

19. The method as recited in claim 18; wherein the generating from the image an image hierarchy comprises:

reducing dimensions of the image to the reduced image in accordance to a set of parameters about the mobile device provided by the account manager; wherein one of the parameters indicates the number of keys that can respectively activate the subareas; and generating from the image with respect to the reduced image the detailed version of each of the subareas.

20. The method as recited in claim 19; the method further comprising:

forwarding the detailed version of one of the subareas when a new request is received from the mobile device;

wherein the new request is generated when one of the keys corresponding to the one of the subareas in the reduced image being displayed is activated.

21. The method as recited in claim 20; wherein the new request comprises a hyperlink to the detailed version.

22. The method as recited in claim 17; wherein each of the subareas is further inherently and equally divided into a number of areas, each pointing to a detailed version thereof.

23. A method for recursively displaying on a screen of a mobile device an image having dimensions much larger than the dimension of the screen, the mobile device having a keypad including a number of keys; the method comprises:

fetching the image from a resource on a landnet according to a request from the mobile device; the request comprising an address identifier identifying the resource;

generating from the image a reduced image equally divided into a number of subareas, each of the subareas being provided a hyperlink; and forwarding the reduced image to the mobile device for display.

24. The method as recited in claim 23; further comprising:

generating from the image with respect to the reduced image a detailed version of one of the subareas when a new request is received; wherein the new request is generated when one of the keys corresponding to the one of the subareas in the reduced image being displayed is activated.

25. The method as recited in claim 24; further comprising:

forwarding the detailed version to the mobile device for display thereon.

26. The method as recited in claim 23;

wherein the mobile device is coupled to a wireless data network; and said method further comprising:

receiving the request from the wireless data network; and forward the request to the resource on the landnet.

27. An apparatus for recursively displaying on a screen thereof an image having dimensions much larger than the dimension of the screen, the apparatus comprises:

an input means;

a memory for storing code for a client module; and a processor coupled to the memory executing the code in the memory to cause the client module to:

display on the screen a reduced image forwarded from a server device, the reduced image transformed from the image with respect to a set of parameters associated with the screen;

generate a new request when a key in the input means corresponding to a subarea in the reduced image is activated; and receive a detailed image of the subarea from the server device when the server device renders the new request.

28. The apparatus as recited in claim 27;

wherein the set of parameters include dimensions and resolution information about the screen; and wherein the reduced image is transformed to just fit in the screen.

29. The apparatus as recited in claim 28; wherein the input means is a phone keypad.

30. The apparatus as recited in claim 28; wherein the input means is soft keys displayed in the screen.

31. An apparatus for recursively displaying on a screen of a mobile device an image having dimensions much larger than the dimension of the screen; the mobile device having a keypad including a number of keys; the apparatus comprises:

a memory for storing code for a server module; and a processor coupled to the memory executing the code in the memory to cause the server module to:

fetch the image from a resource on a landnet according to a request from the mobile device; the request comprising an address identifier identifying the resource;

generate from the image an image hierarchy starting with a reduced image equally divided into a number of subareas, each of the subareas pointing to a detailed version thereof; and forward the reduced image top the mobile device for display.

32. The apparatus as recited in claim 31; wherein each of the subareas is further inherently and equally divided into a number of areas, each pointing to a detailed version thereof.

33. The apparatus as recited in claim 31; the request further comprising a device identifier identifying the mobile device; and wherein the processor further causes the server module to:

consult an account manager to determine if the mobile device is authenticated by examining the device identifier;

reduce dimensions of the image to the reduced image in accordance to a set of parameters about the mobile device provided by the account manager; wherein one of the parameters indicates the number of keys that can respectively activate the subareas; and generate from the image with respect to the reduced image the detailed version of each of the subareas.

34. An apparatus for recursively displaying on a screen of a mobile device an image having dimensions much larger than the dimension of the screen; the mobile device having a keypad including a number of keys; the apparatus comprises:

a memory for storing code for a server module; and a processor coupled to the memory executing the code in the memory to cause the server module to:

fetch the image from a resource on a landnet according to a request from the mobile device; the request comprising an address identifier identifying the resource;

generate from the image a reduced image equally divided into a number of subareas, each of the subareas being provided a hyperlink; and forward the reduced image to the mobile device for display.

35. The apparatus as recited in claim 34; wherein the processor further causes the server module to:

generate from the image with respect to the reduced image a detailed version of one of the subareas when a new request is received; wherein the new request is generated when one of the keys corresponding to the one of the subareas in the reduced image being displayed is activated;

forward the detailed version to the mobile device for display thereon.

36. The apparatus as recited in claim 35; wherein the mobile device is coupled to a wireless data network; and wherein the request is received from the wireless data network.

* * * * *

UNITED STATES PATENT AND TRADEMARK OFFICE
CERTIFICATE OF CORRECTION

PATENT NO. : 6,684,087 B1
DATED : January 27, 2004
INVENTOR(S) : Yu et al.

It is certified that error appears in the above-identified patent and that said Letters Patent is hereby corrected as shown below:

Column 1,
Line 23, change "called" to -- called a --.
Line 27, change "make requests" to -- gain access --.
Line 53, change "are often lack of a" to -- often lack a --.
Line 55, change "becomes even a" to -- becomes an even --.

Column 2,
Line 3, change "graphics make it" to -- graphics which make it --.
Line 16, change "each embedded a" to -- each has an embedded --.
Line 17, change "and associated" to -- and is associated --.
Line 19, change "device, a user" to -- device, and a user --.

Column 3,
Line 59, change "controllers, and capable" to -- controllers capable --.

Column 4,
Line 27, change "characters and" to -- characters wide and --.
Lines 42-43, change "that, however, use" to -- that use --.
Line 46, change "of hardware" to -- of the hardware --.
Line 51, change "(ROM)" to -- (RAM) --.

Column 5,
Line 4, change "has sufficient" to -- have sufficient --.
Line 11, change "mechanism, low" to -- mechanisms and low --.
Line 29, change "300, that" to -- 300, which --.
Line 33, change "obscuring aspect" to -- obscuring aspects --.

Column 7,
Line 3, change "is go Am generated" to -- is generated --.
Line 7, change "inches commonly" to -- inches as commonly --.
Line 7, change "in the" to -- in a --.
Line 16, change "and a screen" to -- and the screen --.
Lines 42 and 49, change "Bay area" to -- Bay Area --.
Line 50, change "to reveal" to -- to be revealed --.
Line 63, change "link sever" to -- link server --.

UNITED STATES PATENT AND TRADEMARK OFFICE
CERTIFICATE OF CORRECTION

PATENT NO. : 6,684,087 B1
DATED : January 27, 2004
INVENTOR(S) : Yu et al.

It is certified that error appears in the above-identified patent and that said Letters Patent is hereby corrected as shown below:

Column 8,
Line 29, change "underlaying hyperlink" to -- underlying hyperlink --.
Line 36, change "device, at 642" to -- devices, at 642 --.
Line 42, change "retrieve a set" to -- retrieves a set --.
Line 42, change "about his" to -- about this --.
Line 43, change "screen that" to -- screen that the --.
Line 65, change "properly for" to -- properly fit for --.

Column 9,
Line 22, change "be a" to -- be --.

Column 12,
Line 41, change "top the" to -- to the --.

Signed and Sealed this

Sixth Day of June, 2006

JON W. DUDAS
*Director of the United States Patent and Trademark Office*